F. E. MORS AND J. A. BURT.
TRAFFIC SIGNAL.
APPLICATION FILED SEPT. 14, 1918.

1,334,628.

Patented Mar. 23, 1920.

Inventors
FRANK E. MORS and
JAMES A. BURT.

Witness
Karl H. Butler
Anna M. Dorr.

By

Attorneys

UNITED STATES PATENT OFFICE.

FRANK E. MORS AND JAMES A. BURT, OF DETROIT, MICHIGAN.

TRAFFIC-SIGNAL.

1,334,628.  Specification of Letters Patent.  Patented Mar. 23, 1920.

Application filed September 14, 1918. Serial No. 254,036.

*To all whom it may concern:*

Be it known that we, FRANK E. MORS and JAMES A. BURT, citizens of the United States of America, residing at Detroit, in the county of Wayne and State of Michigan, have invented certain new and useful Improvements in Traffic-Signals, of which the following is a specification, reference being had therein to the accompanying drawings.

In our application for patent on a traffic signal filed Oct. 18, 1917, Serial No. 197,241, and allowed May 27, 1918, there is disclosed a signal of the semaphore type adapted to be attached to an automobile and actuated from the clutch or brake pedal thereof, so that when the automobile is about to stop or slow up, the signal will be displayed to indicate to the operator of a following automobile that the signal carrying automobile is about to stop or turn into another lane of travel. The construction disclosed in this allowed application necessitates an attachment for the steering post or column of the automobile, and now we aim to eliminate any connections with the steering post or column and to provide a traffic signal that may be readily installed in connection with the well known types of automobiles now in use.

The present invention further aims to provide a traffic signal embodying a semaphore arm, a lever connected thereto and which defines the active position of the semaphore arm, and a pedal attachment connected to said lever for actuating the same and at the same time permit of said pedal being further actuated without effecting said lever.

We further aim to accomplish the above results by a simple, durable and inexpensive construction which will be hereinafter specifically described and then claimed, and reference will now be had to the drawings, wherein Figure 1 is a perspective view of a portion of an automobile provided with the signal and with the casing removed to show a portion of the operating mechanism;

Figure 1:
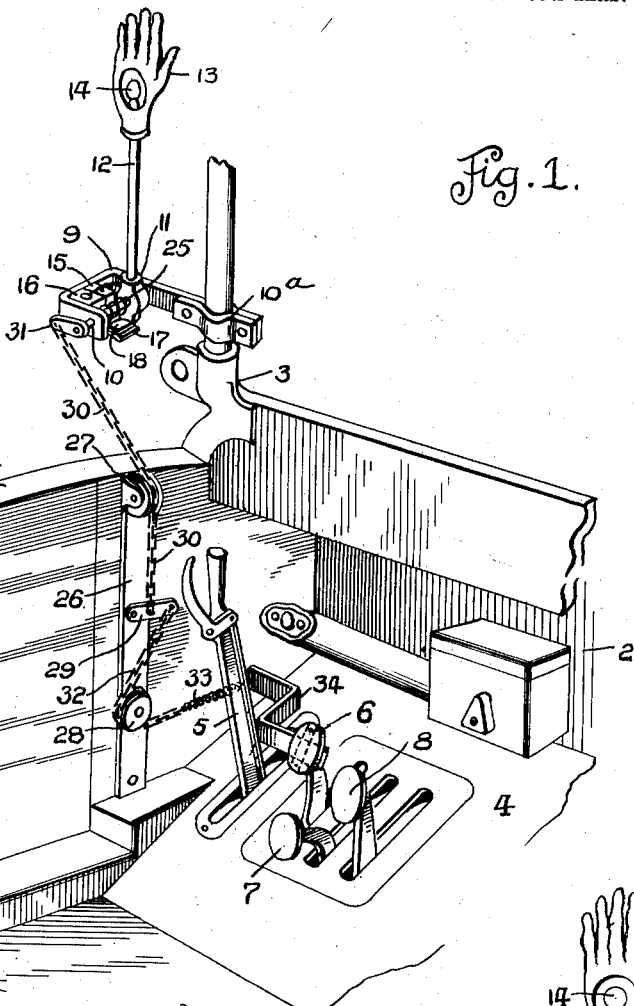
Figure 2:
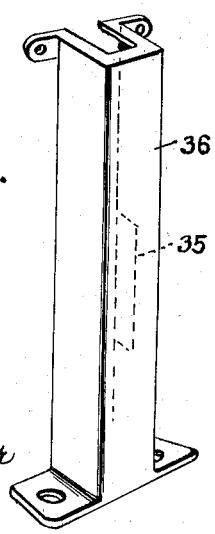
Fig. 2 is an enlarged perspective view of the detached casing.

In the drawings, the reference numeral 1 denotes a portion of an automobile body having a dash 2 provided with a windshield 3, and 4 denotes a footboard through which extends an emergency brake lever 5, a clutch pedal 6, a reverse pedal 7, and a brake pedal 8, all of these elements being of the ordinary and well known type common to a well known make of automobile.

Our traffic signal embodies a windshield equipment and an automobile body equipment, the windshield equipment comprising a bracket 9 clamped or otherwise connected, as at 10¹, to the windshield 3, so that the bracket will extend outwardly at the side of the automobile. Journaled in the outer end of the bracket 9 is a rock shaft 10 and mounted on said rock shaft within the bracket 9 is a hollow socket member 11 supporting a tubular semaphore arm 12. On the outer end of the semaphore arm 12 is a hollow signal member 13, preferably in the form of a hand provided with display openings for an incandescent lamp 14 located within the signal member 13.

Figure 3:
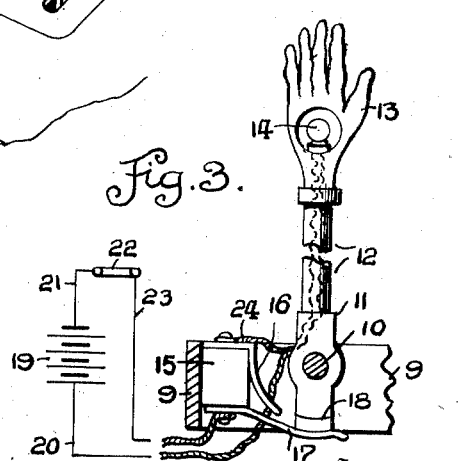
Fig. 3 is a detailed sectional view of a portion of the signal, illustrating diagrammatically electrical connections therewith.
Figure 3:

In the bracket 9 is fixed a support 15, preferably of insulation material, for resilient contact members 16 and 17, the former being secured to the top of the support 15 and extending downwardly in proximity to the contact member 17 which is secured to the bottom of said support. The support 15 is located at one side of the bracket 9 so as to provide clearance for a swinging or lowering movement of the semaphore arm 12, and the socket member 11 of said semaphore arm has a side extension 18 adapted to engage a contact member 17 and hold said member normally out of engagement relative to the member 16. This is best shown in Fig. 3 and it is through the medium of the contact members 16 and 17 that the electric circuit through the lamp 14 is broken when the semaphore arm is in a vertical inactive position.

Referring to the electrical connections to the lamp 14, the reference numeral 19 denotes batteries or a suitable source of electrical energy connected by a wire 20 to the lamp 14, said wire extending into the hollow socket member 11 and the tubular semaphore arm 12. The battery 19 is also connected by a wire 21 to a small switch 22 and said switch is connected by a wire 23 to the contact member 17. The contact member 16 is connected by a wire 23 to the lamp 14, and when the side extension 18 of the semaphore arm releases the contact member 17, said member will engage the contact 16 and establish an electric circuit in connection with the lamp 14 when the switch 22 is closed. The switch 22 is not actually necessary, but may be employed to break the electric circuit to the lamp 14, especially during the day time.

On the rock shaft 10 is a coiled spring 25, which has one end thereof fixed to the bracket 9, and the opposite end thereof connected to the hollow socket member 11, the retractile force of said spring maintaining the semaphore arm normally vertical and restoring said arm to its normal position after said arm has been lowered for signal purposes.

The body equipment comprises a plate 26 suitably secured to the inner wall of the automobile body 1 adjacent the foot board 4 and said plate is provided with sheaves or pulleys 27 and 28. Intermediate the sheaves 27 and 28 is a lever 29 which is pivoted on the plate 26 and connected to a chain or flexible member 30 that extends upwardly over the sheaves 27 and it is attached to a crank 31 on the rock shaft 10. The chain 30 is connected to the lever 29 adjacent its pivot and the outer end of said lever is connected to a chain 32 or flexible member that is trained under the sheave 28 and connected to a coiled spring or yieldable member 33, which in turn is connected to an offset arm 34 suitably clamped to the clutch pedal 6 so as to move in synchronism therewith. The arm 34 is offset to provide clearance for the emergency brake lever 5, as clearly shown in Fig. 1.

A casing 36 may be fitted over the plate 26 and suitably secured to the automobile body 1, said casing being slotted as at 35 to provide clearance for the outer end of the lever 29 and the chain or flexible member 32.

In operation, the tension of the spring 33 is such that an initial movement of the clutch pedal 6 causes said pedal to actuate the signal. The chains 30 and 32 are pulled upon and the shaft 10 is rocked to lower the semaphore arm 12, to indicate to a following automobile that the signal carrying automobile is about to stop or turn into another lane of travel. Of course, with the switch 22 closed, an electric circuit is completed in the lamp 14 when the resilient contact member 17 engages the contact member 16. During this operation the lever 29 has been swung downwardly to its limit of travel, so that any further pull on the chain 32 will be against the pivot of said lever and the plate 26 thus preventing the semaphore arm 12 from being unduly actuated or injured by an excessive lowering movement.

An initial movement of the clutch pedal 6 has accomplished this operation and further movement of the clutch pedal is permitted by the expansion of the spring 33 without effecting the remainder of the mechanism. When the clutch pedal 6 assumes normal position, the spring 25 associated with the rock shaft 10 restores the semaphore arm to a vertical inactive position and also places the connections between said rock shaft and the offset arm 34 in normal position for another operation of the signal.

Any suitable provision may be made for inclosing the electrical contact members of the bracket 9, and it is obvious that this bracket may be designed for attachment to an automobile body in lieu of the windshield 3.

What we claim is:—

1. Means adapted for actuating an automobile signal arm comprising a pivoted lever adapted for attachment to an automobile, a flexible member connected to said lever and adapted for oscillating a signal arm, an offset arm adapted for attachment to the clutch pedal of the automobile and offset to provide clearance for the emergency brake lever of the automobile, and connections between said pivoted lever and said offset arm so that said offset arm may actuate the signal arm and move independent thereof.

2. Means adapted for actuating an automobile signal arm comprising a pivoted lever having connections with the arm and by its limited movement defining a movement of the arm, and movable means connected to said pivoted lever and by its initial movement adapted to actuate said lever and the movable arm and during further movement operate independent of the movable arm.

In testimony whereof we affix our signatures in presence of two witnesses.

FRANK E. MORS.
JAMES A. BURT.

Witnesses:
KARL H. BUTLER,
ANNA M. DORR.